United States Patent [19]

Simon

[11] Patent Number: 4,635,477

[45] Date of Patent: Jan. 13, 1987

[54] LEAK DETECTOR FOR THE DIKES OF NUCLEAR COOLING PONDS

[75] Inventor: Andre Simon, Les Bons Villers, Belgium

[73] Assignee: Ateliers de Constructions Electriques de Charleroi, Charleroi, Belgium

[21] Appl. No.: 585,279

[22] Filed: Mar. 1, 1984

[30] Foreign Application Priority Data

Mar. 1, 1984 [EP] European Pat. Off. ........ 83870013.6

[51] Int. Cl.4 ............................................. G01F 23/00
[52] U.S. Cl. ................................... 73/290 R; 73/291; 376/250; 137/312
[58] Field of Search ............................ 73/290 R, 291; 137/516.25, 312, 427; 376/272, 250, 205, 206

[56] References Cited

U.S. PATENT DOCUMENTS

| | | | |
|---|---|---|---|
| 1,566,182 | 12/1925 | Chappell | 340/625 |
| 2,243,188 | 5/1941 | Biach | 137/427 |
| 3,055,538 | 9/1962 | Schoessow | 376/205 |
| 3,110,157 | 11/1963 | Radd | 137/312 |
| 3,276,246 | 10/1966 | Truman et al. | 137/312 |
| 3,533,530 | 10/1970 | Gallo et al. | 376/205 |
| 3,717,352 | 2/1973 | Jansing et al. | 376/206 |
| 3,835,878 | 9/1974 | Braidt et al. | 137/557 |
| 3,935,062 | 1/1976 | Keller et al. | 376/272 |
| 4,026,763 | 5/1977 | Poindexter | 376/206 |
| 4,355,000 | 10/1982 | Lumelleau | 376/205 |

FOREIGN PATENT DOCUMENTS

| | | | |
|---|---|---|---|
| 1525051 | 4/1968 | France | 376/206 |
| 937588 | 9/1963 | United Kingdom | 376/205 |

Primary Examiner—Charles Frankfort
Assistant Examiner—Thomas B. Will
Attorney, Agent, or Firm—Schwartz, Jeffery, Schwaab, Mack, Blumenthal & Evans

[57] ABSTRACT

A device for detecting sealing defects and for measuring the leakage rate of gaskets placed in parallel relationship on the lateral surface of a gate separating the compartments of a storage pool for nuclear fuel elements has a small volume of free space between the gaskets. This volume is connected by means of a tube with two leakage level detectors placed at different levels which emit a signal when a predetermined water level is attained in the tight volume.

12 Claims, 10 Drawing Figures

LEAK DETECTOR FOR THE DIKES OF NUCLEAR COOLING PONDS

BACKGROUND OF THE INVENTION

The present invention relates to an apparatus for detecting and accurately measuring leaks between compartments of water-filled storage basins used in storing radiated fuel.

In nuclear stations and in reprocessing plants the radiated fuel is required to be stored in large basins filled with water. The water serves both as a biological shield against the radiation emitted during the decay of fission products and as a vehicle for the removal of the residual heat of the fuel.

These large storage basins are divided into several independent compartments capable of communicating with one another by the opening of one or several dikes. If a compartment is isolated from other compartments by the closing of the dikes, it is important, for a number of reasons, to assure the water tightness of each dike between the gate and its frame. For example, it may be necessary to prevent the mixing of waters of different chemical conditions contained in adjacent compartments, or it may be necessary to drain one of the compartments to perform maintenance or repair work.

SUMMARY OF THE INVENTION

It is therefore an object of the present invention to provide a leak detecting apparatus.

A specific object of the present invention is to provide an apparatus for detecting and measuring leaks between compartments of water-filled storage basins used in storing radiated fuel.

Another object is to provide an automatic leak detecting apparatus for continuously monitoring leakage rate.

Yet another object is to provide a leak detecting apparatus having a recording system for recording the leakage rate.

In accomplishing the foregoing objects, there has been provided in accordance with the present invention an apparatus for monitoring the leakage of water between adjacent compartments of a basin, comprising a dike comprising a gate for closing an opening between two adjacent compartments of a water basin, a plurality of gaskets extending along the lateral surface of the gate, a raised rib extending along the wall of the opening wherein the gaskets, the rib and the opening wall comprise a free space when the dike is in a closed position, and means for detecting the level of water in the free space.

Further objects, features and advantages of the present invention will become apparent from the detailed description of preferred embodiments which followed when considered in view of the figures of drawing.

BRIEF DESCRIPTION OF THE DRAWINGS

A dike pivotally mounted on hinges is illustrated in the drawings as follows.

DETAILED DESCRIPTION OF PREFERRED EMBODIMENT

The present invention relates to an apparatus, which, when attached to every dike, permits the rapid detection of a leak and the measurement of its magnitude. The apparatus may be adapted both to the frame of a gate mounted on hinges and to the vertical slide rail of a sliding panel. It is sufficient for this purpose if the lateral surface of the gate or the sliding panel be equipped with at least two gaskets placed side by side on its periphery. The apparatus comprises level detectors connected to a free space provided between the gaskets of the gate or the sliding panel in the closed position.

Figure 1A:
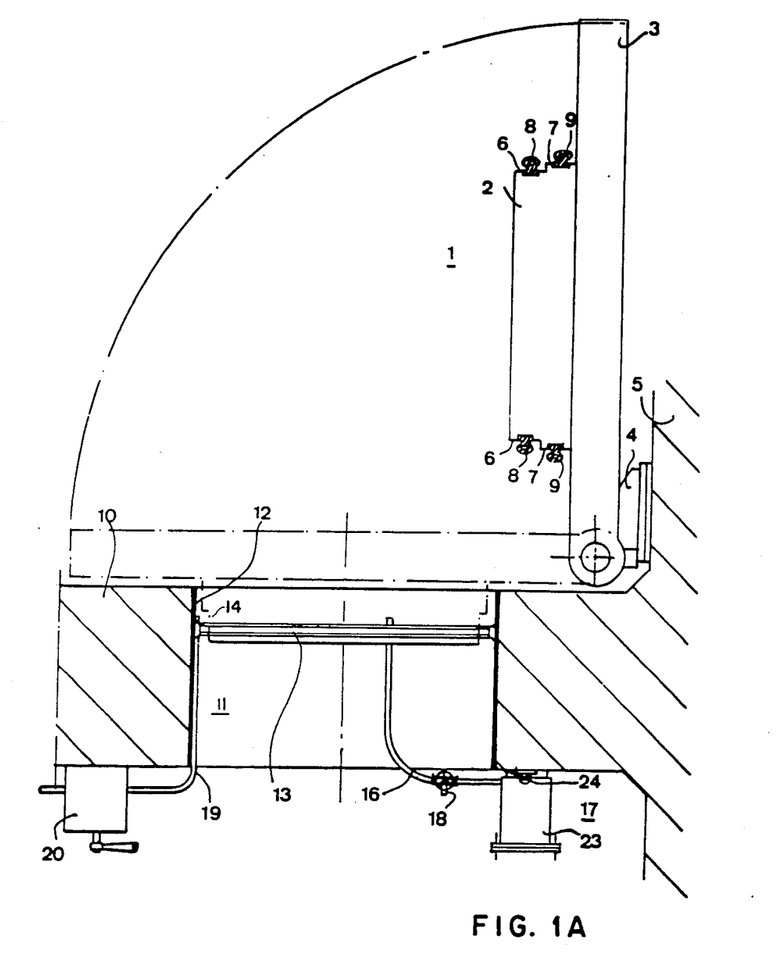
FIG. 1A is a top view of a dike.

FIG. 1A shows a dike 1 including a gate 2 supported by a plurality of cross-beams distributed over the immersed height of the dike 1. Each cross-beam of which only one upper beam 3 is shown, is provided at one end with a hinge 4 attached to a wall 5 of the basin.

The gate 2 has a large thickness and is equipped at the center of its thickness with a sill extending over the entire immersed part of the gate 2 to define two stepped lateral support surfaces 6 and 7 for the gaskets 8 and 9 which are inflatable when the gate 2 is in the closed position.

A partitioning wall 10, separating the basin into compartments is provided with an opening 11 with rounded corners at the bottom to give the opening a U-shape. The opening 11 is lined on the inside with a metal cover 12 having a raised rib or bead 13 of an appropriate width and positioned so as to serve as a stop surface for the gasket 8 when the dike 1 is closed. The metal covering 12 and the rib 13 constitute the frame 14 for the gate 2. When the dike 1 is in the closed state, the gasket 9 directly abuts against a part of the metal covering 12. In this manner, the rib 13, the two gaskets 8 and 9 and the surfaces located between the two gaskets 8 and 9 and belonging respectively to the gate 2 and the frame 14, define a free space 15 (see FIG. 3) which is normally dry, even when the compartments of the basin located on either side of the partitioning wall 10 are immersed.

Figure 2A:
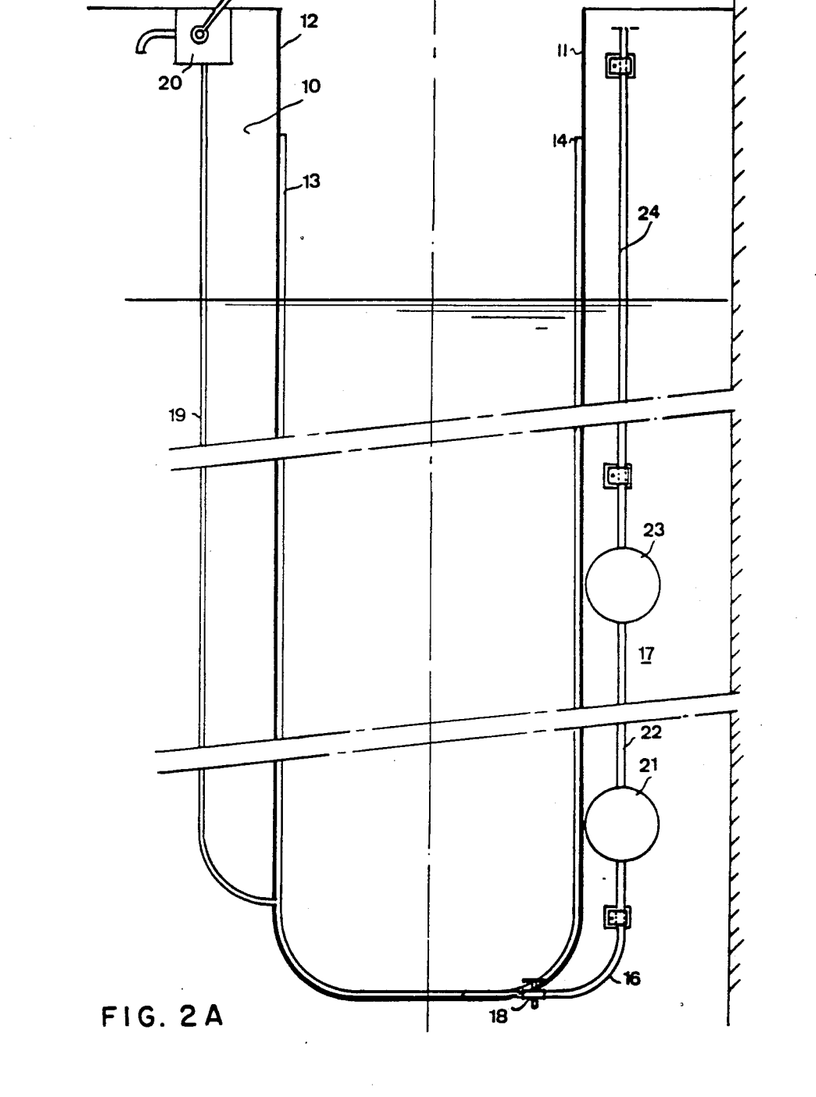
FIGS. 2A-2C are front elevations of an opening connecting two adjacent compartments of the dike.

A tube 16 opens into the lower part of the free space 15 which extends along the entire immersed parts of the gate 2. The tube 16 is connected to a level detection device 17 and equipped with a drain cock 18. A second tube 19 connected with a manual pump 20 also opens into the free space 15 at the location shown in FIG. 2.

FIG. 2A is a front elevation of the partitioning wall 10 and its U-shaped opening 11, lined inside with the metal covering 12, to which the rib 13 is fastened to form the frame 14 of the gate 2.

The detection device 17 comprises a first level detector 21 connected by a tube 22 with a second level detector 23. A tube 24 extends above the level of the water and serves as an overflow.

In the free space 15, the tube 19 opens at a level slightly lower than that of the first level detector 21. The role of the tube 19 and of the manual pump 20 shall be explained in greater detail below.

Figure 3:
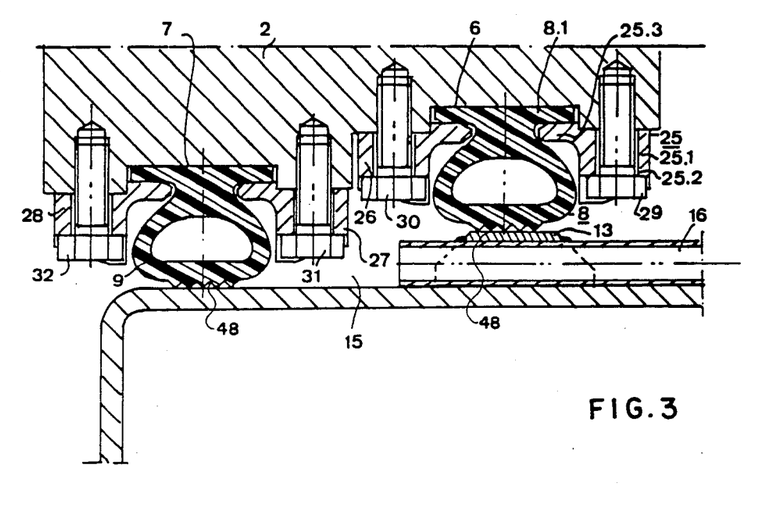
FIG. 3 is a sectional view of joints placed in series.

FIG. 3 is a sectional view taken along the axis of the tube 16 showing in detail the gaskets 8 and 9 and their fastening means. The latter comprises fastener pieces 25, 26, 27 and 28 retained by the screws 29, 30, 31, 32, regularly distributed over the length of the gaskets 8 and 9.

The tube 16 has a diameter smaller than the rib 13, and opens into the free space 15 so as not to interrupt the tightness of the seal at the location where the tube 16 passes through the rib 13 between the gasket 8 and its stop surface comprising the rib 13. Each fastening piece, for example the fastening piece 25, comprises a principal body 25.1, adapted in configuration to the circumference of the gate 2 and having apertures 25.2 regularly distributed over the length of the gasket 8, and an extension 25.3, also extending over the length of the gasket 8 and having a thickness capable of clamping, in a controlled manner, the wing of a flange 8.1 of the gasket 8.

In the embodiment of FIG. 3, the gaskets 8 and 9 are inflatable and have several longitudinal grooves 48 which, during the displacement of the dike 1, sweep the mating surfaces to remove small particles of foreign matter which might affect the tightness of the seal.

When the gate 2 is closed, the free space 15 located between the gaskets 8 and 9 is normally tight and remains dry. But when one of the gaskets is defective, the space 15 fills with water at a variable rate, depending on the magnitude of the leak. In case of a leak the volume to be filled is the free space 15, the tubes 16 and 19 connected with the free space 15, the level detectors 21 and 23 and the connecting tube 22.

The level detectors are designed to emit a signal when a predetermined water level is attained. Then, to determine the rate of the leak of the gate 2, it is sufficient to calibrate the portion of the fill volume between the two level detectors 21 and 23, this portion being designated the standard volume, and to measure the time passing between the signal emitted by the level detector 21 and the signal emitted by the level detector 23. The larger the leak, the shorter will be the time separating the two signals emitted by the level detectors 21 and 23.

To determine the evolution of the leakage rate, the tube 19 opening into the free space 15 slightly below the level of the first level detector 21, is connected to a manual pump 20. The tube 19 and the manual pump 20 provide for evacuation of the water coming from the leak so as to reduce the level below the level corresponding to the emission of a signal by the first level detector 21. In this manner, by comparing the volume being filled and the time elapsing between the two signals emitted by the two level detectors 21 and 23, it is possible to determine the leakage rate. For example, when the compartment located on the drain cock 18 side of the gate 2 is empty, for the purpose of maintenance or repairs, it is possible to immediately verify the tightness of the seal of the gasket 9 by opening the drain cock 18 which, being located at the low point of the volume to be filled in case of a leak, will allow water to flow therefrom whenever a tightness defect of the seal of the gasket 9 appears, thus making it possible to obtain the necessary measures.

Figure 1B:
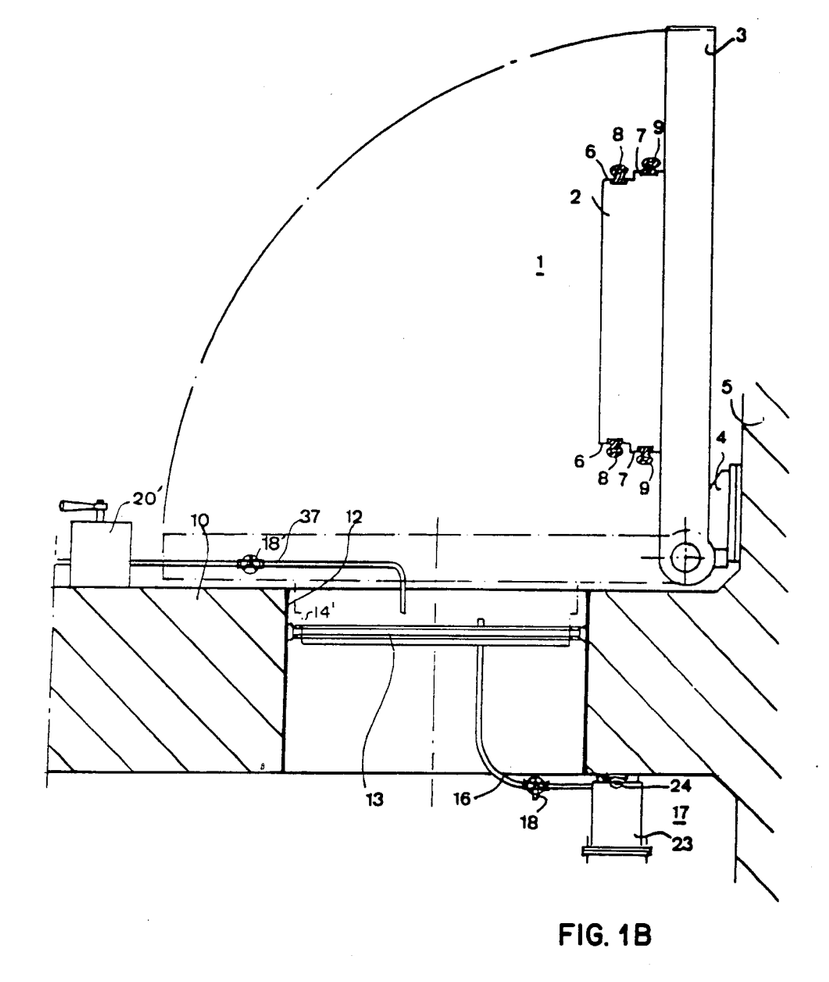
FIG. 1B is a top view of another embodiment of the dike.

In the embodiment shown in FIGS. 1 and 3, the abutting surfaces 6 and 7 are staggered in order to prevent the adherence of the gasket 8 to the frame 14 during the opening or closing of the gate.

Figure 2B:
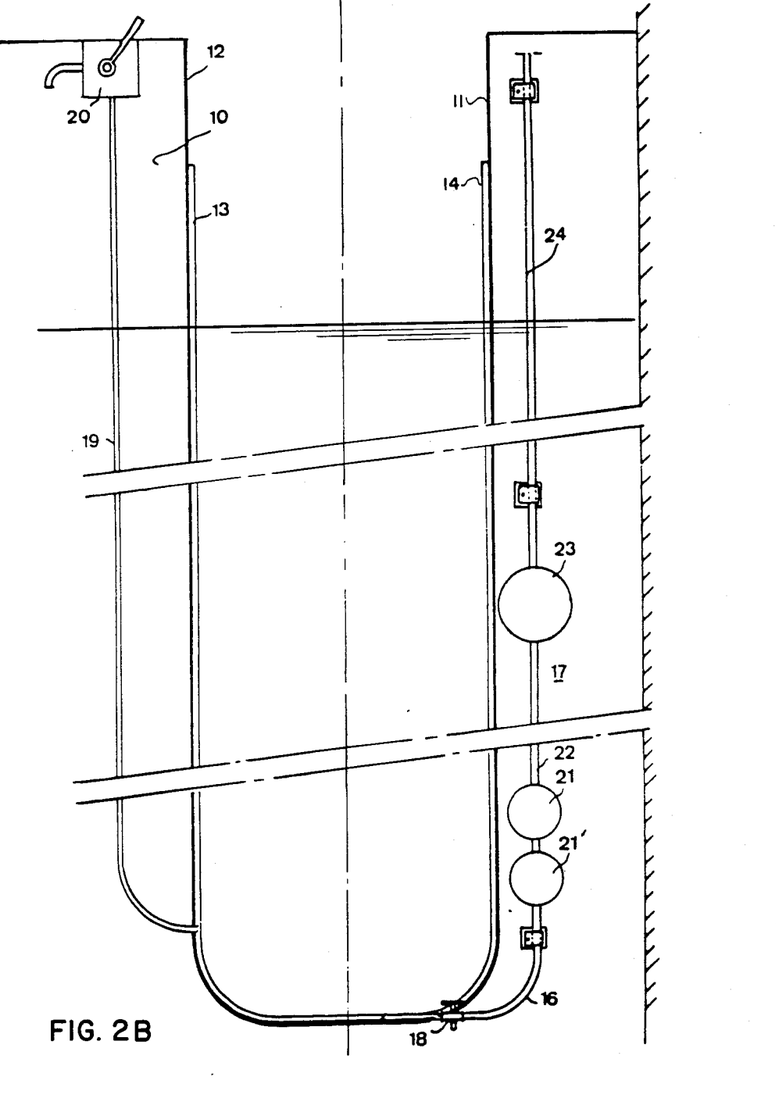
Figure 2C:
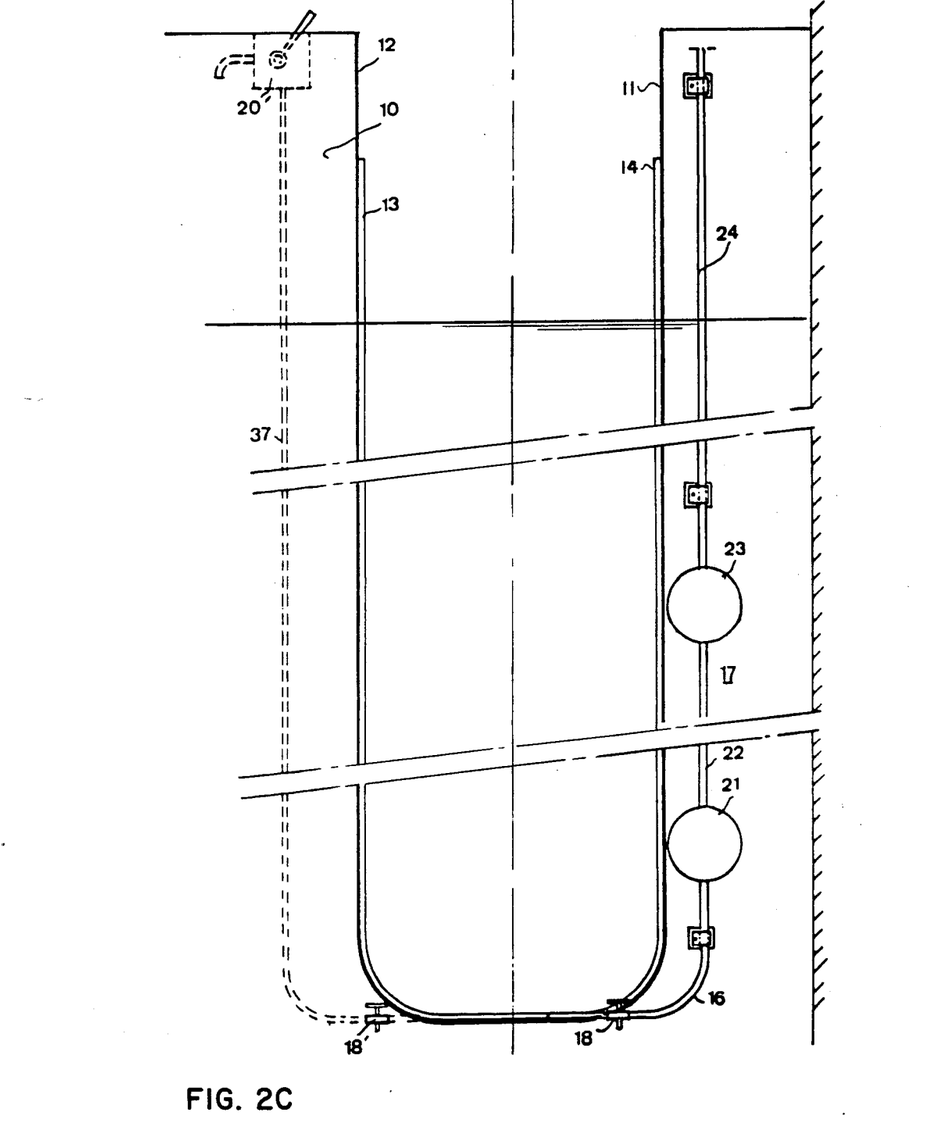
Figure 4:
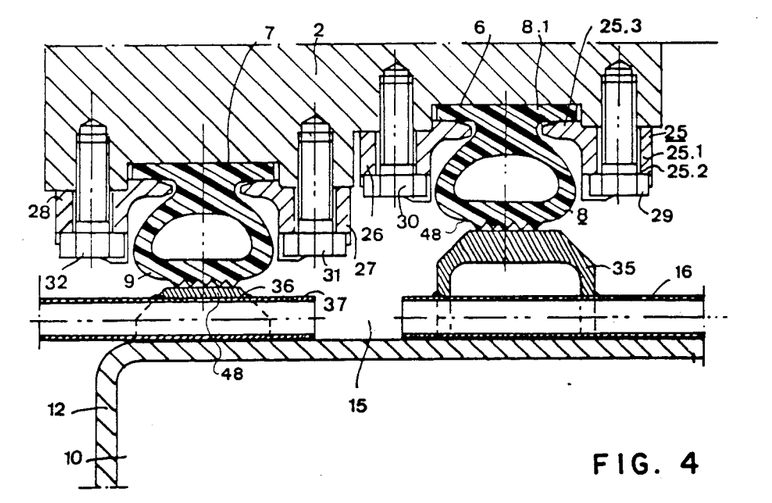
FIG. 4 is a variant of another embodiment.

In a further embodiment shown in FIGS. 1B, 2C, and 4, the gaskets 8 and 9 have as their abutting surface raised ribs 35 and 36, respectively, both fastened to the metal covering 12 over the entire length of the gaskets 8 and 9 to form the frame 14' of the gate. The ribs 35 and 36 are positioned so that the abutting surfaces are offset to avoid the gasket 8 sticking to the rib 36 during the movement of the partition.

The tube 16 passing through the rib 35 is connected to the detection device 17, and the tube 16 contains at its lowest point a drain cock 18 which is accessible when the compartment located on the side of the level detector 17 is drained, while the tube 37 passing through the other rib 36 is connected with the manual pump 20' (FIGS. 1B and 2C). In this embodiment, the manual pump 20' and the detection device 17 are located on opposite sides of the partitioning wall 10. This layout makes it possible, in particular, to insert in the tube 37 a second drain cock 18' (FIG. 2C) located at the lowest point of the free space 15 and accessible when the compartment located on the side opposite to the detection device 17 is empty.

In a further embodiment, a free space such as 15, connected with a detection device such as 17 may consist of two inflatable gaskets of different shapes or sizes, attached to the gate 2 and cooperating with the appropriate abutting surfaces on the frame 14 of the opening 11.

Alarm means may be associated with the detection device comprising the two level detectors 21 and 23, to alert the operating personnel to the appearance of a leakage problem. The alarm means is combined with a recording system if desired. The alarm and the recording system are actuated by the emission of a signal by an auxiliary level detector 21', shown in FIG. 2B, placed just below the first level detector 21. As the water level rises gradually in the free space 15, it first attains the emission level of the auxiliary detector, which actuates the alarm alerting the personnel, or, in a completely automatic installation, actuates simultaneously both the alarm and the recording system. In the latter case, the system records the time passing between the two signals emitted by the level detectors 21 and 23 and actuates at the end of a cycle an electric pump which drains the free space 15, so that a second recording cycle may commence, indicating a possible increase in the leakage rate.

Figure 5A:
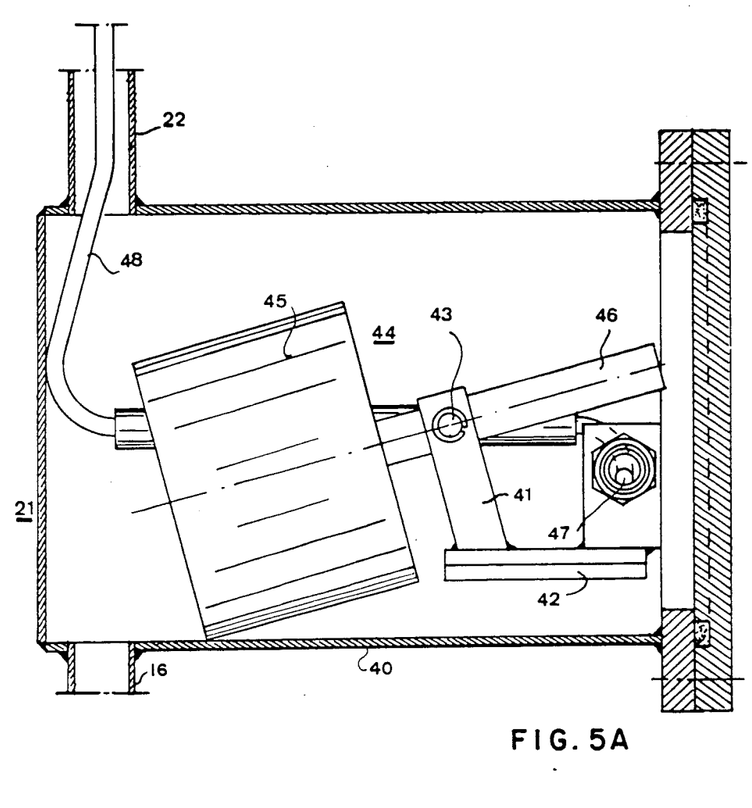
FIGS. 5A-5B and 6 are sectional views of a level detector.

The level detectors 21 and 23 shown in FIG. 2A are identical in configuration. FIG. 5A shows the details of an example of one of the detectors.

Referring to FIG. 5, the level detector 21 comprises a cylindrical body 40 with a horizontal axis, into which the tubes 16 and 22 open at diametrically opposed points, i.e., at the top and the bottom of the cylindrical body 40. An arm 41 is located in the cylindrical body 40, and is attached to a bottom plate 42 which is supported by the walls of the cylindrical body 40. The arm 41 includes an axle 43 upon which a balance 44 pivots. The balance is equipped at one end with a float 45 and is extended at the other end by a metal piece 46. When the cylindrical body 40 is filled gradually with water, the float 45 rises in the cylindrical body 40 and, by pivoting, the balance 44 lowers the metal piece 46 in front of a proximity detector 47 which emits a signal when the balance 44 reaches a predetermined position. The proximity detector 41 is supplied with electric power by the lines 48, protected against any external impact by the tube 22 serving as sheathing.

Figure 5B:
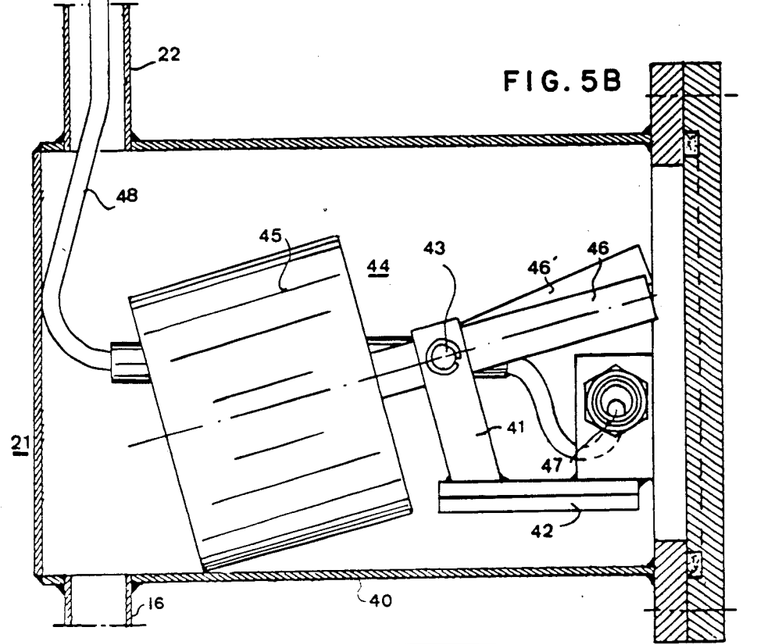
Figure 6:
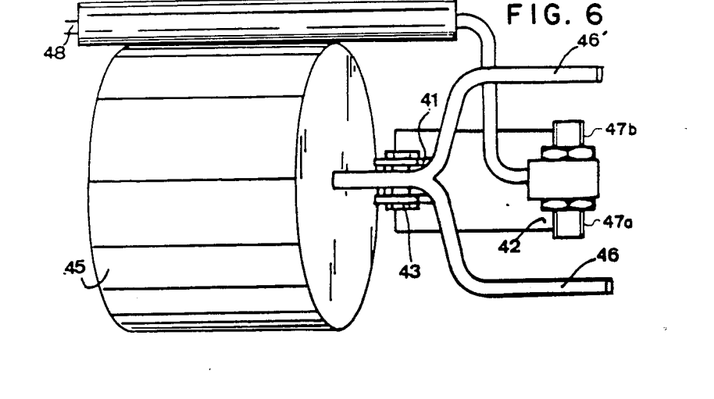

In another embodiment shown in FIGS. 5B and 6 of the lower level detector 21, two proximity detectors 47a and 47b may be superposed on the path followed by the metal pieces 46 and 46', thereby obtaining two distinct signals providing either directly the leakage rate or a first signal to alert the operating personnel or actuating the recording system, followed by a second signal yielding the exact moment of the attainment of the first predetermined level.

Similarly, in the upper level detector 23, the superposition of proximity detectors will emit a first signal corresponding to the moment wherein the second predetermined level is attained, followed by a second signal deactivating the recording system and actuating the device to drain the free space 15.

What is claimed is:

1. An apparatus for monitoring and measuring the leakage of water between adjacent compartments of a water basin, comprising:
   a dike comprising a gate for closing an opening between two adjacent compartments of said water basin;
   a plurality of gaskets extending along a lateral surface of said gate;
   a raised rib extending along a wall of said opening, wherein said gaskets, said rib and said wall comprise a free space when said dike is in a closed position;
   means for detecting the level of water in said free space, said means for detecting the level of water in said free space providing a calibration reference volume; and
   said detecting means generating electrical signals providing an indication of the rate of water leakage into said free space.

2. An apparatus as claimed in claim 1, wherein said water level detecting means comprises:
   a first level detector;
   a first tube connecting said free space and said first level detector;
   a second level detector positioned above said first level detector; and
   a second tube connecting said first level detector and said second level detector.

3. An apparatus as claimed in claim 2, wherein said level detecting means further comprises a pump and a third tube, said third tube connecting said pump to said free space at a level below said first level detector.

4. An apparatus as claimed in claim 3, further comprising a drain cock positioned at the lowest point of said first tube connecting said free space and said first level detector.

5. An apparatus as claimed in claim 3, further comprising a drain cock positioned at the lowest point of said third tube, said pump and said level detecting means being on opposite sides of said dike.

6. An apparatus as claimed in claim 1, wherein at least one of the lateral faces of said gate comprises a stepped structure.

7. An apparatus as claimed in claim 3, wherein said raised rib comprises a thickness greater than the diameters of said first and third tubes.

8. An apparatus as claimed in claim 3, further comprising a first auxiliary level detector positioned along said first tube at a level below said first level detector, said first auxiliary level detector being connected with said free space at a level below said first auxiliary level detector.

9. An apparatus as claimed in claim 2, wherein each of said first and second level detectors comprises a cylindrical body and includes a bottom plate, an arm-like member having an axle and supported on said bottom plate, a balance member which pivots around said axle, said balance member being provided on one ends with a metal piece, and at least one proximity detector which emits a signal when activated by said metal piece.

10. An apparatus as claimed in claim 9, further comprising two proximity detectors superposed on the path followed by said metal piece, said proximity detectors being connected to means to convert the time between said signals into an indication of the leakage rate.

11. An apparatus as claimed in claim 1, wherein the wall of said opening includes a metal covering.

12. An apparatus as claimed in claim 9, further comprising two proximity detectors superposed on the path followed by said metal pieces, said first proximity detector being connected to means for emitting an alert signal or for actuating a recording system and said second proximity detector yielding the exact moment of the attainment of a predetermined level of volume of leakage.

* * * * *